Figure 1:
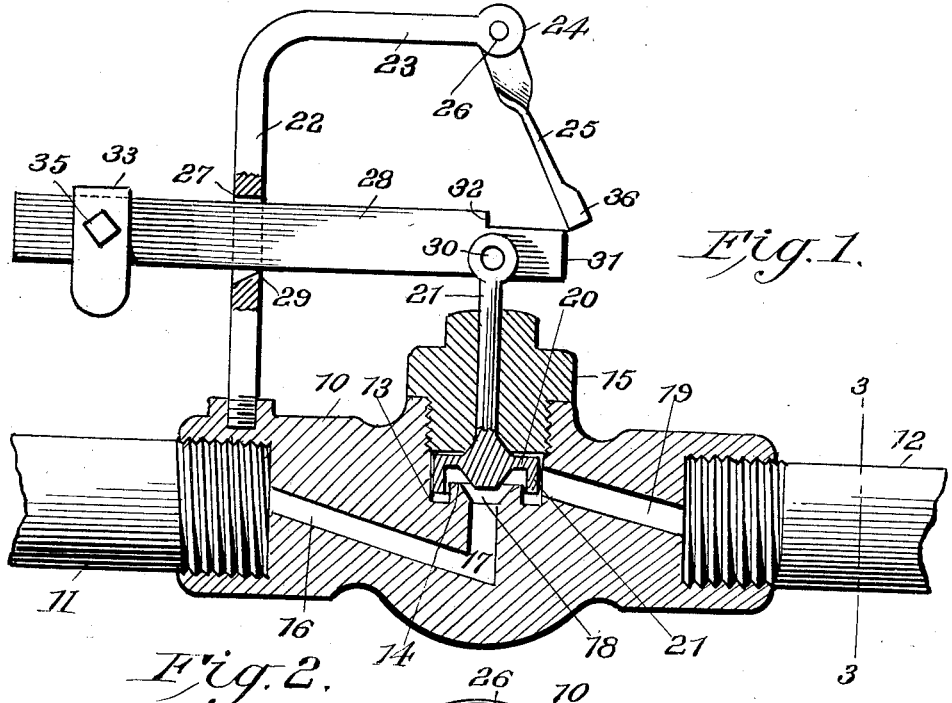

L. F. HAGER.
SAFETY GAS VALVE.
APPLICATION FILED OCT. 10, 1912.

1,084,425.

Patented Jan. 13, 1914.

WITNESSES

INVENTOR
L. F. Hager

Attorneys

UNITED STATES PATENT OFFICE.

LOUIS F. HAGER, OF DAYTON, OHIO.

SAFETY GAS-VALVE.

1,084,425.  Specification of Letters Patent.  Patented Jan. 13, 1914.

Application filed October 10, 1912.  Serial No. 725,095.

*To all whom it may concern:*

Be it known that I, LOUIS F. HAGER, a citizen of the United States, residing at Dayton, in the county of Montgomery and State of Ohio, have invented certain new and useful Improvements in Safety Gas-Valves, of which the following is a specification.

This invention relates to improvements in automatic safety valves, more particularly to devices of this character employed for controlling the flow of gas under relatively slight pressure, and has for one of its objects to provide a valve so adjusted and balanced that a slight reduction of pressure will cause the valve to automatically close and thus shut off the further flow of the gas.

The improved device is designed more particularly for use in connection with gas employed for lighting and heating purposes to automatically shut off the flow in event of the pressure decreasing below a predetermined point or to a weak or dangerous degree, and thus obviate the danger of explosion or asphyxiation.

With these and other objects in view the invention consists in certain novel features of construction as hereinafter shown and described and then specifically pointed out in the claims, and in the drawings illustrative of the preferred embodiment of the invention.

Figure 2:
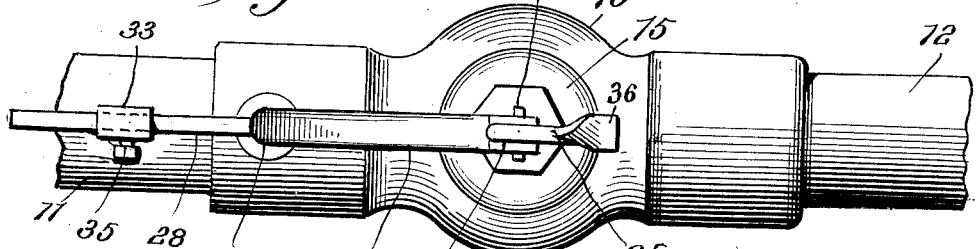
Figure 3:
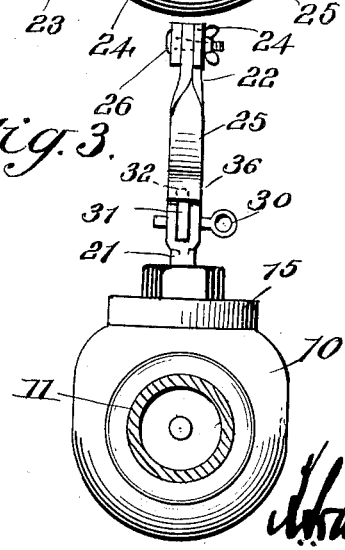

Figure 1 is a side elevation with the body of the valve casing and the valve in longitudinal section. Fig. 2 is a plan view. Fig. 3 is an end elevation with the outlet pipe in transverse section on the line 3—3 of Fig. 1.

Corresponding and like parts are referred to in the following description and indicated in all the views of the drawings by the same reference characters.

The improved valve may be located at any desired point in the system of piping, but will generally be located between the meter and the first burner, and comprises a body 10 having the intake pipe 11 entering at one end and the discharge pipe 12 leading therefrom at the opposite end. Formed within the body is a relatively large valve chamber 13 having an elevated center portion 14 and opening through the upper side of the body and with the outwardly opening portion internally threaded to receive a threaded plug 15. An intake passage 16 is formed in the body 10 and leading inwardly from the intake end and directed upwardly into the valve chamber, as shown at 17 and with a conical valve seat 18 at the outlet end of the portion 17 of the passage. A discharge passage 19 leads from the valve chamber through the discharge end of the body.

A valve 20 is located within the valve chamber and with a downwardly directed annular rib 21 which engages in the space between the inner walls of the valve chamber and the outer walls of the enlargement 14. The lower face of the valve 20 is conical and engages the conical valve seat 18 when the valve is depressed. The valve 20 is provided with a stem 21 which extends through the plug 15 and is preferably slightly enlarged next to the body of the valve in conical shape to engage in a conical seat in the bottom of the plug when the valve is in its elevated position, as shown in Fig. 1. By this means a gas tight joint is produced between the stem and its valve and the plug to prevent the escape of the gas when the plug is in its elevated position and the gas is under its greatest pressure.

Rising from the body 10 is a standard or post 22 with its upper end directed laterally, as shown at 23, toward the plug 15 and with its free end forked as represented at 24 in which its locking member 25 is pivotally supported, as shown at 26. The post 22 is provided with a transverse slot indicated at 27 through which a lever member 28 extends. The lower side of the slot 27 is knife-edged, as shown at 29 and the lever 28 is poised upon this knife-edged terminal as shown. The lever 28 is pivoted at 30 in the forked upper end of the stem 21 with one end of the lever extending in advance of the stem, as shown at 31, and with a lateral stop shoulder 32 in its upper edge in alinement with the longitudinal plane of the stem. The lever 28 extends beyond the post 22 and is supplied with a balance weight 33. The weight 33 is provided with a set screw 35 to enable the weight 33 to be clamped to the lever 28 and adjusted longitudinally thereof. By this simple means the valve 20 may be delicately balanced by adjusting the weight 33 upon the lever 28, as will be obvious. The member 25 is enlarged at its lower end, as shown at 36 to increase its weight, and rests against the end 31 of the member 28 when the valve 20 is in its open or upper position, as shown in Fig. 1. When the valve 20 closes the lever 28 will be carried downward with the stem thus releasing the member 25 and permitting it to swing against the stop shoulder 32 and in engagement with the upper edge of the lever 28 next to the stop shoulder and thus lock the valve into its closed position.

The member 25 will be manually released and the weight 33 so adjusted that the normal or ordinary pressure of the gas will maintain the valve 20 in open position, and so long as the normal pressure continues the member 25 together with the lever 28 and weight 33 remain inactive, but in event of the pressure being decreased below a certain predetermined point, the weight of the valve together with its stem and the adjacent portion of the lever 28 will overcome the inertia of the balance weight 33 and cause the valve to move downwardly into closed position, and this movement will automatically release the member 25 and permit it to swing over the upper edge of the lever 28 and against the stop shoulder 32 and thus effectually lock the stem 21 and its valve 20 in closed position and shut off the further flow of the gas.

The improved device is simple in construction, can be inexpensively manufactured and applied and does not interfere with the ordinary flow of the gas when the pressure is normal, but in event of the decreasing of the pressure below the safety point the valve will be automatically closed and locked in its closed position.

Having thus described the invention, what is claimed as new is:

1. A casing having a passage therethrough and with a valve seat intermediate the passage, a valve engaging said seat and maintained normally open by the pressure through the passage, a lever operatively engaging said valve and urging it to a closed position, and a latch device swinging independently of the lever and held thereby out of operative position relative to the valve when the valve is open and released and permitted to fall and lock the lever and valve when the valve is closed.

2. A casing having a passage therethrough and with a valve seat intermediate the passage, a valve engaging said seat and maintained normally open by the pressure through the passage, a stationary support, a lever poised upon said support and operatively engaging said valve and urging it to a closed position, adjusting means carried by said lever, and a latch device swinging independently of the lever and held thereby out of operative position relative to the valve when the valve is open and released and permitted to fall and lock the lever and valve when the valve is closed.

3. A casing having a passage therethrough and with a valve seat intermediate the passage, a valve engaging said seat and maintained normally open by the pressure through the passage, a stationary support, a lever poised upon said support and operatively engaging said valve and urging it to a closed position, a counter-weight carried by said lever and adjustable thereon, and a latch device swinging independently of the lever and held thereby out of operative position relative to the valve when the valve is open and released and permitted to fall and lock the lever and valve when the valve is closed.

4. A casing having a passage therethrough and with a valve seat intermediate the passage, a valve engaging said seat and maintained normally open by the pressure of the gas flow through the passage, a stem carried by said valve, a lever swinging upon said stem and extending at one end laterally of the same, a pivoted lock lever with the pivot thereof in alinement with the longitudinal axis of the stem and engaging the extension of the lever and held thereby obliquely to the axis of the stem when the valve is open and released and permitted to fall into alinement with the stem and lock the valve when closed.

5. A casing having a passage therethrough and with a valve seat intermediate the passage, a valve engaging said seat and maintained normally open by the pressure of gas flowing through the passage, a stem carried by said valve, a lever swinging upon said stem and weighted at one end and with the other end extending beyond the stem, a pivoted lock lever with the pivot thereof in alinement with the longitudinal axis of the stem and engaging the extension of the lever and held thereby obliquely to the axis of the stem when the valve is open and released and permitted to fall into alinement with the stem and lock the valve closed.

6. A casing having a passage therethrough and with a valve intermediate the passage, a valve engaging said seat and maintained normally open by the pressure of the casing through the passage, a stem carried by said valve, a lever swinging upon said stem and extending at one end laterally of the same, a pivoted latch device engaging the extension of the lever and held thereby obliquely to the axis of the stem when the valve is open and released and permitted to fall into engagement with the lever and lock the valve closed when the lever is actuated by the closing of the valve.

In testimony whereof I affix my signature in presence of two witnesses.

LOUIS F. HAGER. [L. S.]

Witnesses:
FRANK H. KRONAUGE,
J. P. BENDER.